United States Patent [19]

Averbuch et al.

[11] Patent Number: 5,896,566
[45] Date of Patent: *Apr. 20, 1999

[54] METHOD FOR INDICATING AVAILABILITY OF UPDATED SOFTWARE TO PORTABLE WIRELESS COMMUNICATION UNITS

[75] Inventors: Ziva Averbuch; Rod Averbuch, both of Buffalo Grove, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/508,656

[22] Filed: Jul. 28, 1995

[51] Int. Cl.⁶ ............................................ H04Q 7/34
[52] U.S. Cl. .................... 455/419; 455/423; 455/517; 455/575; 395/712
[58] Field of Search ............................ 455/38.1, 38.2, 455/33.1, 54.1, 54.2, 66, 68, 69, 70, 88, 89, 186.1, 67.1, 226.1, 422–4, 517, 550–556, 7, 575, 418–20; 379/57, 58, 63, 61, 62; 340/825.44, 825.54, 825.22; 39/712

[56] References Cited

U.S. PATENT DOCUMENTS

| | | | |
|---|---|---|---|
| 5,012,234 | 4/1991 | Dulaney et al. | 455/186.1 X |
| 5,109,403 | 4/1992 | Sutphin | 379/63 X |
| 5,297,192 | 3/1994 | Gerszberg | 379/58 X |
| 5,349,697 | 9/1994 | Pelkonen | 455/89 |
| 5,388,212 | 2/1995 | Grube et al. | 379/62 X |
| 5,414,751 | 5/1995 | Yamada | 379/58 |
| 5,507,009 | 4/1996 | Grube et al. | 455/54.2 X |
| 5,586,304 | 12/1996 | Stupek, Jr. | 395/712 |

*Primary Examiner*—Wellington Chin
*Assistant Examiner*—Philip J. Sobutka

[57] ABSTRACT

In a wireless communication system (100), updated software is downloaded to a server (104). In response to a software update query sent by the server, a portable wireless communication unit (101) sends a software update response back to the server. The software update response can include a priority indication and a usage indication. A software update acknowledgment, sent to the portable wireless communication unit by the server in response to the software update response, causes the portable wireless communication unit to internally set a flag indicating the availability of the updated software. Once aware of the availability of the updated software, the portable wireless communication unit can download the updated software using a combined battery charger/software downloader (108).

15 Claims, 2 Drawing Sheets

METHOD FOR INDICATING AVAILABILITY OF UPDATED SOFTWARE TO PORTABLE WIRELESS COMMUNICATION UNITS

FIELD OF THE INVENTION

The present invention relates generally to wireless communication systems and, in particular, to a method for indicating availability of updated software to portable wireless communication units.

BACKGROUND OF THE INVENTION

Wireless communication systems are known to comprise wireless communication units, such as in-car mobile and/or hand-held portable radios, that communicate with each other and a fixed infrastructure using wireless communication resources. Many of the user features provided by such wireless communication units are often based on software programs stored and executed within the wireless communication units. That is, algorithms electronically stored in memories are executed by processing devices, such as microprocessors, to realize certain features.

As existing features are improved and new features are developed for wireless communication units, new versions of software become available with increasing frequency. Users of wireless communication units typically desire to receive the newest versions of updated software as quickly and as efficiently as possible in order to take advantage of the improvements.

Prior art approaches for delivering updated software to wireless communication units are not always convenient and/or efficient. One method requires a user to bring the wireless communication unit to a central location, such as a service shop operated by a system administrator or service provider. The unit is then either provided with replacement parts containing the updated software (i.e., replacement memory devices) or physically connected to a device that transfers the updated software to the unit. Regardless of how the updated software is actually transferred, this method is both time-consuming and inconvenient to users since they are typically required to bring their unit in for service during normal work hours.

Another method is used to overcome the difficulties presented by the previous method. To this end, the wireless communication units are capable of receiving the updated software wirelessly as a special type of data message. This eliminates the need to physically alter the unit or to co-locate the unit with a reprogramming device. However, updated software versions often comprise many megabytes of data; transmission of such a large amount of data can be prohibitively expensive. That is, the extensive use of wireless communication resources required to send the updated software to a large number of units, as is often the case with even a modest-sized communication system, would significantly impact the system's ability to provide regular services. Therefore, a need exists for an approach that allows updated software to be provided without the inconvenience of bringing the unit to a service shop and which does not place a prohibitively large burden on wireless communication resources.

DESCRIPTION OF A PREFERRED EMBODIMENT

The present invention provides a method that allows portable wireless communication units to be notified of the availability of updated software. In accordance with the present invention, updated software is downloaded to a server. In response to a software update query sent by the server, a portable wireless communication unit sends a software update response back to the server. In one embodiment, the software update query is sent when it is determined that the portable wireless communication unit has outdated software. A software update acknowledgment, sent to the portable wireless communication unit by the server in response to the software update response, causes the portable wireless communication unit to internally set a flag indicating the availability of the updated software.

In yet another aspect of a preferred embodiment, the software update acknowledgment is sent based on a priority indication and/or a usage indication included in the software update response. Using the above-described approach, a portable wireless communication unit is made aware of the availability of updated software in an efficient manner. Once aware of the availability of the updated software, the portable wireless communication unit can download the updated software using a combined battery charger/software downloader, thus avoiding the need to perform expensive software downloads over the air.

Figure 1:
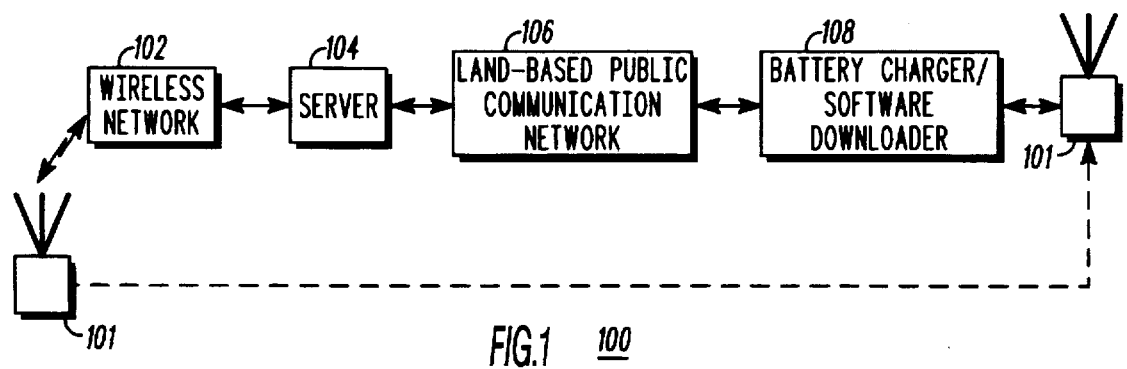
FIG. 1 is a block diagram of a wireless communication system.

The present invention can be more fully described with reference to FIGS. 1–5. FIG. 1 is a block diagram of a wireless communication system 100 comprising a plurality of portable wireless communication units 101 (only one shown), a wireless network 102, a server 104, a land-based public communication network 106, and a battery charger/software downloader 108. The portable wireless communication unit 101 may comprise any type of portable radio or radiotelephone and is described in further detail below. The dotted line shown indicates two possible states for the portable wireless communication unit 101: communicating with the wireless network 102 or with the battery charger/software downloader 108, as described below. The wireless network 102 provides wireless communication connectivity for the portable wireless communication units 101 and can be, for example, a digital cellular system using time-division multiplexed access (TDMA) or code-division multiplexed access (CDMA) protocols. Furthermore, the wireless network 102 is in communication with the server 104.

The server 104 is used to receive and store updated software for later downloading to the portable wireless communication units 101. The server 104 supports client server protocols allowing it to communicate with both the wireless network 102 and the land-based public communication network 106. The land-based public communication network 106 may comprise a public switched telephone network (PSTN) or integrated services digital network (ISDN).

The battery charger/software downloader 108 serves a dual function when coupled to the portable wireless communication unit 101: charging batteries for the portable wireless communication unit 101 and performing software downloads when necessary. An embodiment of the battery charger/software downloader 108 is described in a co-pending U.S. patent application entitled METHOD AND APPARATUS FOR DOWNLOADING UPDATED SOFTWARE TO PORTABLE WIRELESS COMMUNICATION UNITS having U.S. patent application Ser. No. 8/508,658 and filed on the same day as the present application.

Figure 2:
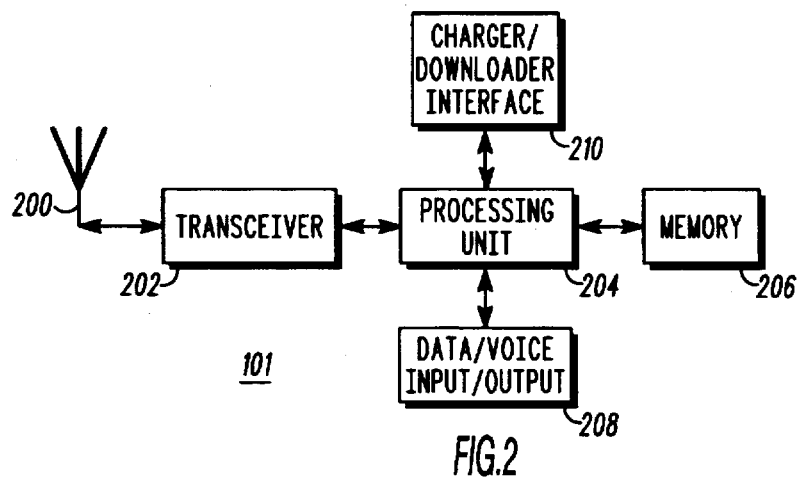
FIG. 2 is a block diagram of the portable wireless communication unit shown in FIG. 1.

FIG. 2 is a block diagram of the portable wireless communication unit 101 comprising an antenna 200, a transceiver 202, a processing unit 204, memory 206, a data/voice input/output device (I/O) 208, and a charger/downloader interface 210. The antenna 200 and transceiver 202 together allow information to be wirelessly transmitted/received and, in a preferred embodiment, are suitable for radio frequency (RF) transmission/reception.

The processing unit 204 may comprise one or more processing devices, such as microprocessors and/or digital signal processors. The processing unit 204 performs all necessary processing and formatting for the transmission and reception of digital voice and/or data signals. The voice and/or data signals are received from, and sent to, the data/voice I/O device 208 which may comprise a microphone and speaker for voice signals and an RS-232 port for data signals. Furthermore, the processing unit 204 also executes those procedures necessary to receive indications of updated software availability as well as the actual downloading of updated software.

The procedures executed by the processing unit 204 are stored as software routines, often referred to as code, in the memory 206. In a preferred embodiment, the memory 206 comprises volatile and non-volatile memory. Suitable volatile memory is random-access memory (RAM) for use with temporary operating parameters and the like. Suitable non-volatile memory is electrically-erasable programmable read-only memory (EEPROM) for the storage of tables and software code, including permanent software downloading (boot) code. The non-volatile memory can also be used for storing temporary parameters having non-volatile characteristics, e.g., a flag indicating the presence of updated software.

The charger/downloader interface 210 comprises a connector and power circuitry needed to charge the portable wireless communication unit's battery (not shown). Furthermore, the charger/downloader interface 210 comprises a data interface (such as RS-232 port) that allows the processing unit 204 to perform downloading of updated software.

Figure 3:
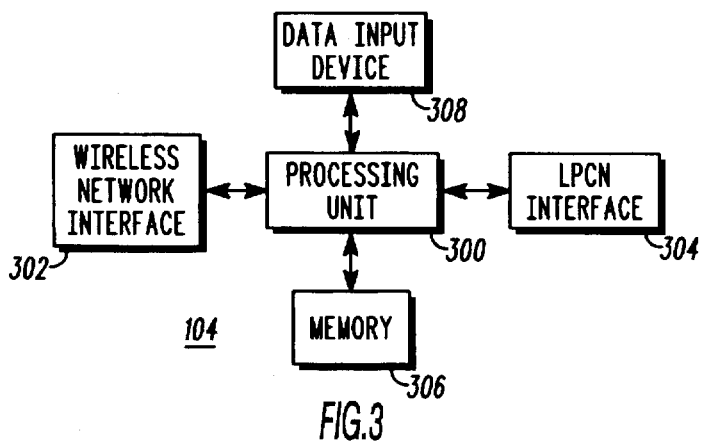
FIG. 3 is a block diagram of the server shown in FIG. 1.

FIG. 3 is a block diagram of the server 104 comprising a processing unit 300, a wireless network interface 302, a land-based public communication network interface 304, memory 306, and a data input device 308. The server 104 can be implemented using a high-performance desktop computer or similarly capable platform. The processing unit 300 may comprise one or more processing devices, such as microprocessors and/or digital signal processors and is used to implement the client server protocols between the server 104 and both the wireless network 102 and the land-based public communication network 106. Additionally, when communicating with the battery charger/software downloader 108 via the land-based public communication network 106, the processing unit 300 also supports the downloading of updated software, stored in the memory 306, to the portable wireless communication unit 101.

The wireless network interface 302 is based on standard control interface such as X.25 to a control entity in the wireless network 102. The control and processing functions of the wireless network interface 302 can be implemented using a separate processing device or as part of the processing unit 300. In a similar vein, the land-based public communication network interface 304 is based on an interface such as ISDN PRI/BRI or PSTN modem pool.

The memory 306 is used for the storage of code and temporary parameters necessary for the operation of the server 104. Additionally, the memory 306 is used for storage of updated software intended for use in the portable wireless communication unit 101. Such updated software is downloaded to the server 104 using the data input device 308, such as a floppy drive, a local area network (LAN) interface, or RS-232 port. As before, the memory 306 may comprise a combination of volatile and non-volatile memory such as RAM, ROM and magnetic disk. Using the portable wireless communication unit 101 and server 104 described above, a method for notifying the portable wireless communication unit 101 of the availability of software is described below.

Figure 4:
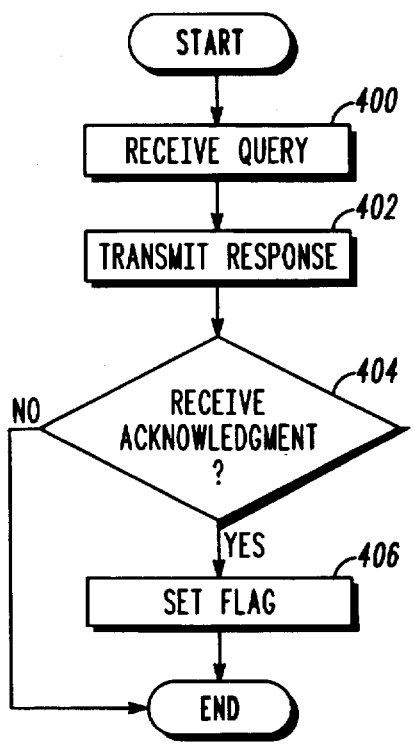
FIG. 4 is a flow chart illustrating operation of the portable wireless communication unit of FIG. 1.

FIG. 4 is a flow chart that describes operation of the portable wireless communication unit 101. At step 400, the portable wireless communication unit 101 receives a software update query originally sent by the server 104 via the wireless network 102. In a preferred embodiment, the software update query is sent to a network management entity associated with the wireless network 102, which then sends the software update query as a control message to the portable wireless communication unit 101 via a control channel. The software update query is a request for the portable wireless communication unit to respond with information relevant to its current software status.

At step 402, the portable wireless communication unit, in response to the software update query, sends a software update response, via the wireless network 102, to the server 104. The software update response comprises one or more fields and, at a minimum, one of the fields specifies the current version number (or version numbers if more than one set of software is potentially affected) of the resident software.

In one embodiment of the present invention, a usage indication is included with the software update response. The usage indication indicates what types of services are used by the portable wireless communication unit 101, e.g., dispatch service only, etc. The usage indication can be a hard coded parameter based on those services purchased by the user of a portable wireless communication unit. The usage indication, when sent, is used by the server 104 to decide whether the latest updated software is relevant to a particular type of user. In this manner, it can be determined that a given portable need not receive an indication of the availability of updated software only affecting services other than those used by that portable.

In another embodiment of the present invention, a priority indication is included with the software update response. The priority indication is based on the presence of a special service in a given portable or on a relative importance level of a particular user. The priority indication is thus defined during configuration of each portable. In a preferred embodiment, the priority indication comprises a numerical value indicative of a corresponding priority level, wherein a unique value is reserved (e.g., a priority indication of 0) to indicate that the particular user is not capable of getting the automatic update service. The priority indication, when present, is used by the server 104 to spread the loading placed on the server 104 due to later downloading of updated software. Thus, users having higher priority will receive indication of the updated software before users having lower priority.

At step 404, it is determined if a software update acknowledgment has been received. As discussed below, the software acknowledgment is received only when the server determines that a given portable wireless communication unit should receive the updated software. Assuming that a software update acknowledgment has been received, the portable wireless communication unit 101 will set a flag, at step 406, in its memory. The flag serves as an indication of the availability of updated software. From the above discussion, it is readily apparent that the present invention significantly reduces the amount of wireless communication resource usage since only an indication of the availability of updated software is sent rather than the actual update software itself. The actual downloading of the updated software, based on the flag, is described in detail in the related U.S. patent application entitled METHOD AND APPARATUS FOR DOWNLOADING UPDATED SOFTWARE TO PORTABLE WIRELESS COMMUNICATION UNITS.

Figure 5:
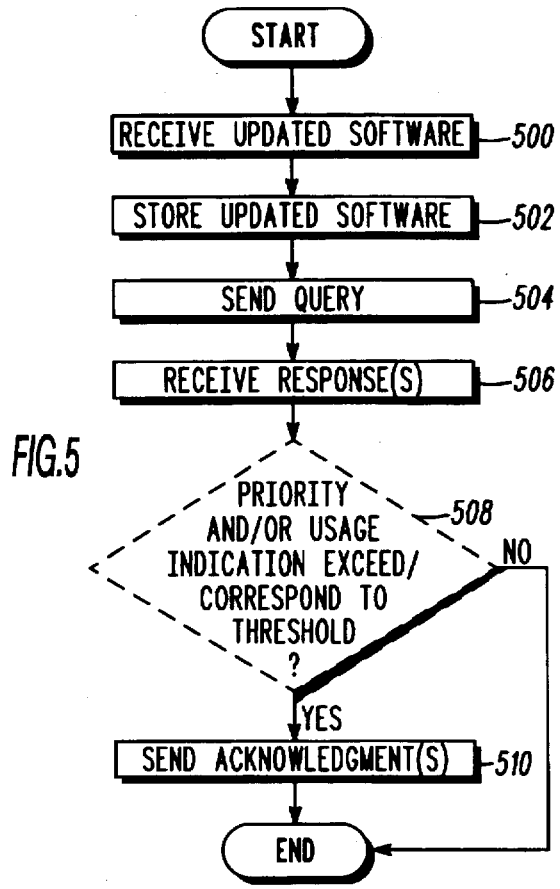
FIG. 5 is a flow chart illustrating operation of the server of FIG. 1.

FIG. 5 is a flow chart that describes operation of the server 104. At step 500, the server 104 receives updated software. The updated software can serve to fix known software bugs or the updated software could include new and/or improved features. Regardless of the reason, the updated software is downloaded to the server 104 directly through the data input device 308 or via the land-based public communication network interface 304. Usage and priority thresholds, as determined by a system administrator based on, for example, changes made in the updated software, are also downloaded with the updated software.

At step 502, the updated software (as well as the usage and priority thresholds) is stored in memory 306. In a preferred embodiment, the updated software is stored as several binary files on a magnetic disk.

At step 504, the server 104 sends the software update query as described above. In one embodiment, the server sends the software update query to all portable units in the system. In another embodiment, the server 104 can compare a version number included with the updated software against version numbers previously received from portable units (through the inclusion, for example, of the software version number with routine affiliation or location update network control messages). Thus, portable units having software versions less recent than the updated software would be identified as likely candidates to receive the updated software and hence, the software update query.

At step 506, the server 104 receives software update responses from those units that received the software update query. The software update responses can include priority and usage indications, as described above. In one embodiment of the present invention, the software update acknowledgment can be automatically sent, at step 510, to those portable units that sent in a software update response.

In another embodiment, the priority and usage indications included with each software update response are compared, at step 508, with the usage and priority thresholds included at step 500. As mentioned above, these thresholds are determined by a system administrator, or a similarly empowered entity, based on the nature of the updated software. For example, if the updated software is relevant only to new dispatch-related features, the usage threshold will be set to a value such that only usage indications from dispatch users will correspond to the usage threshold. If other services and features are similarly affected in the updated software, the usage threshold is adjusted accordingly.

The priority threshold is similarly based on the updated software, and could be considered in conjunction with the usage threshold or as an independent qualifier. For example, the priority threshold for updated software including only minor features and/or bug fixes is set high so that only those users who have paid an extra premium for high maintenance service, and are thus assigned a high priority, will be acknowledged immediately. Units corresponding to a lower maintenance fee, and thus assigned a lower priority, either receive delayed acknowledgment or no acknowledgment at all. In this manner, loading placed on the server can be controlled according to the priority threshold for each version of updated software.

For each software update response in which the priority indication exceeds the priority threshold (unit has high enough priority) and/or corresponds to the usage threshold (unit uses affected feature), the software update acknowledgment is sent to the appropriate portable wireless communication units at step 510.

With the present invention, a method that allows portable wireless communication units to be notified of the availability of updated software is provided. Prior art methods of providing updated software to portable wireless communication units required manual re-programming of the portable or over-the-air downloading of the updated software. Although the over-the-air method is more convenient than the manual method, it typically requires significant use of relatively scarce wireless communication resources. The present invention, using a series of software update queries, responses, and acknowledgments offers a more efficient method because portables are merely notified of the presence of updated software, thus providing the convenience of over-the-air methods but requiring less usage of wireless communication resources.

We claim:

1. In a portable wireless communication unit comprising a wireless transceiver, a processing unit operably coupled to the wireless transceiver, and a memory operably coupled to the processing unit, a method for the portable wireless communication unit to receive indication of availability of updated software, the method comprising steps of:

receiving a software update query via the wireless transceiver;

transmitting a software update response via the wireless transceiver upon receiving the software update query;

receiving a software update acknowledgment, but not the updated software, via the wireless transceiver; and setting a flag by the processing unit in the memory responsive to the software update acknowledgment, wherein the flag indicates the availability of the updated software and is used to initiate downloading of the updated software at a later time.

2. The method of claim 1, wherein the step of transmitting the software update response further comprises transmitting a priority indication.

3. The method of claim 1, wherein the step of transmitting the software update response further comprises transmitting a usage indication.

4. In a server comprising a processing unit, a wireless network interface operably coupled to the processing unit, a land-based public communication network interface operably coupled to the processing unit, a memory operably coupled to the processing unit, and a data input device operably coupled to the processing unit, a method for the server to indicate to a portable wireless communication unit availability of updated software, the method comprising steps of:

receiving the updated software via the data input device;

storing the updated software in the memory;

sending a software update query to the portable wireless communication unit via the wireless network interface;

receiving a software update response from the portable wireless communication unit via the wireless network interface; and sending a software update acknowledgment, but not the updated software, to the portable wireless communication unit via the wireless network interface responsive to the software update response, wherein the software update acknowledgment causes the portable wireless communication unit to set a flag indicating the availability of the updated software, and wherein the flag is used to initiate downloading of the updated software at a later time.

5. The method of claim 4, wherein the step of sending the software update query further comprises sending the software update query when it is determined that portable wireless communication unit has outdated software.

6. The method of claim 4, wherein the step of receiving the software update response further comprises receiving a priority indication.

7. The method of claim 6, wherein the step of sending the software update acknowledgment further comprises sending the software update acknowledgment when the priority indication exceeds a priority threshold.

8. The method of claim 4, wherein the step of receiving the software update response further comprises receiving a usage indication.

9. The method of claim 8, wherein the step of sending the software update acknowledgment further comprises sending the software update acknowledgment when the usage indication corresponds to a usage threshold.

10. In a wireless communication system comprising a wireless network, a plurality of portable wireless communication units in communication with the wireless network, and a server operably coupled to the wireless network, a method for a portable wireless communication unit of the plurality of portable wireless communication units to receive indication of availability of updated software, the method comprising the steps of:

at the server:
  receiving the updated software;
  storing the updated software;
  sending a software update query to the portable wireless communication unit via the wireless network;

at the portable wireless communication unit:
  receiving the software update query via a wireless transceiver;
  transmitting a software update response to the server via the wireless network responsive to the software update query;

at the server:
  receiving the software update response via the wireless network;
  sending a software update acknowledgment, but not the updated software, to the portable wireless communication unit via the wireless network responsive to the software update response;

at the portable wireless communication unit:
  receiving the software update acknowledgment via the wireless network; and
  setting a flag responsive to the software update acknowledgment, wherein the flag indicates the availability of the updated software and is used to initiate downloading of the updated software at a later time.

11. The method of claim 10, wherein the step of sending the software update query further comprises sending the software update query when it is determined that portable wireless communication unit has outdated software.

12. The method of claim 10, wherein the step of receiving the software update response further comprises receiving a priority indication.

13. The method of claim 12, wherein the step of sending the software update acknowledgment further comprises sending the software update acknowledgment when the priority indication is greater than a priority threshold.

14. The method of claim 10, wherein the step of receiving the software update response further comprises receiving a usage indication.

15. The method of claim 14, wherein the step of sending the software update acknowledgment further comprises sending the software update acknowledgment when the usage indication is greater than a usage threshold.

* * * * *